United States Patent [19]

Hayek et al.

[11] Patent Number: 5,740,385
[45] Date of Patent: Apr. 14, 1998

[54] LOW LOAD HOST/PCI BUS BRIDGE

[75] Inventors: George R. Hayek, Cameron Park; Brian K. Langendorf, El Dorado Hills, both of Calif.; Aniruddha Kundu, Hillsboro, Oreg.; Kuljit S. Bains, Folsom, Calif.; Gary A. Solomon, Hillsboro, Oreg.

[73] Assignee: Intel Corporation, Santa Clara, Calif.

[21] Appl. No.: 358,359

[22] Filed: Dec. 19, 1994

[51] Int. Cl.$^6$ ............................................. G06F 13/00
[52] U.S. Cl. ................................. 395/308; 395/306
[58] Field of Search ............................ 395/306, 307, 395/308

[56] References Cited

U.S. PATENT DOCUMENTS

| | | |
|---|---|---|
| 5,448,704 | 9/1995 | Spaniol et al. ........................ 395/310 |
| 5,560,022 | 9/1996 | Dunstan et al. ....................... 395/750 |
| 5,564,026 | 10/1996 | Amini et al. .......................... 395/308 |
| 5,564,060 | 10/1996 | Mahalingaiah et al. ............... 395/871 |
| 5,613,075 | 3/1997 | Wade et al. ........................... 395/287 |
| 5,617,557 | 4/1997 | Stevens ................................. 395/473 |

*Primary Examiner*—Jack B. Harvey
*Assistant Examiner*—David A. Wiley
*Attorney, Agent, or Firm*—David J. Kaplan

[57] ABSTRACT

A bridge for coupling a host bus to a peripheral component interconnect (PCI) bus. A controller is used to transfer an address from the host bus while a datapath is used to transfer data from the host bus. The address and data is then transferred to the PCI bus over a set of signal lines coupled to the PCI bus such that each signal line transfers at least a portion of the address as well as at least a portion of data.

53 Claims, 5 Drawing Sheets

LOW LOAD HOST/PCI BUS BRIDGE

FIELD OF THE INVENTION

The present invention relates to computer system bus architectures and more particularly to a host bus to PCI bus bridge.

BACKGROUND OF THE INVENTION

A microprocessor is an electronic device which is capable of performing mathematical computations and other manipulations of information according to given instructions. For this reason, a microprocessor inside a computer is commonly considered to be the "brain" of the computer system. The microprocessor communicates with and controls the flow of information to and from other parts of the computer system through an interlink known as a bus. A typical computer system may comprise different types of buses through which a microprocessor, or other type of processor, communicates with various regions of the computer system.

A host bus is the main bus to which a processor is directly coupled. Through the host bus, the processor can communicate directly with, for example, the computer's main memory, enabling the processor to store and retrieve data. A peripheral component interconnect (PCI) bus is another type of bus through which the processor can communicate with peripheral components of the computer system such as, for example, graphics accelerators, sound cards, and other multimedia devices. Because the processor is not directly coupled to the PCI bus, an interface, or bridge, is used to couple the host bus to the PCI bus. In this manner, the processor can control and exchange information with the PCI bus over the host/PCI bus bridge.

Figure 1:
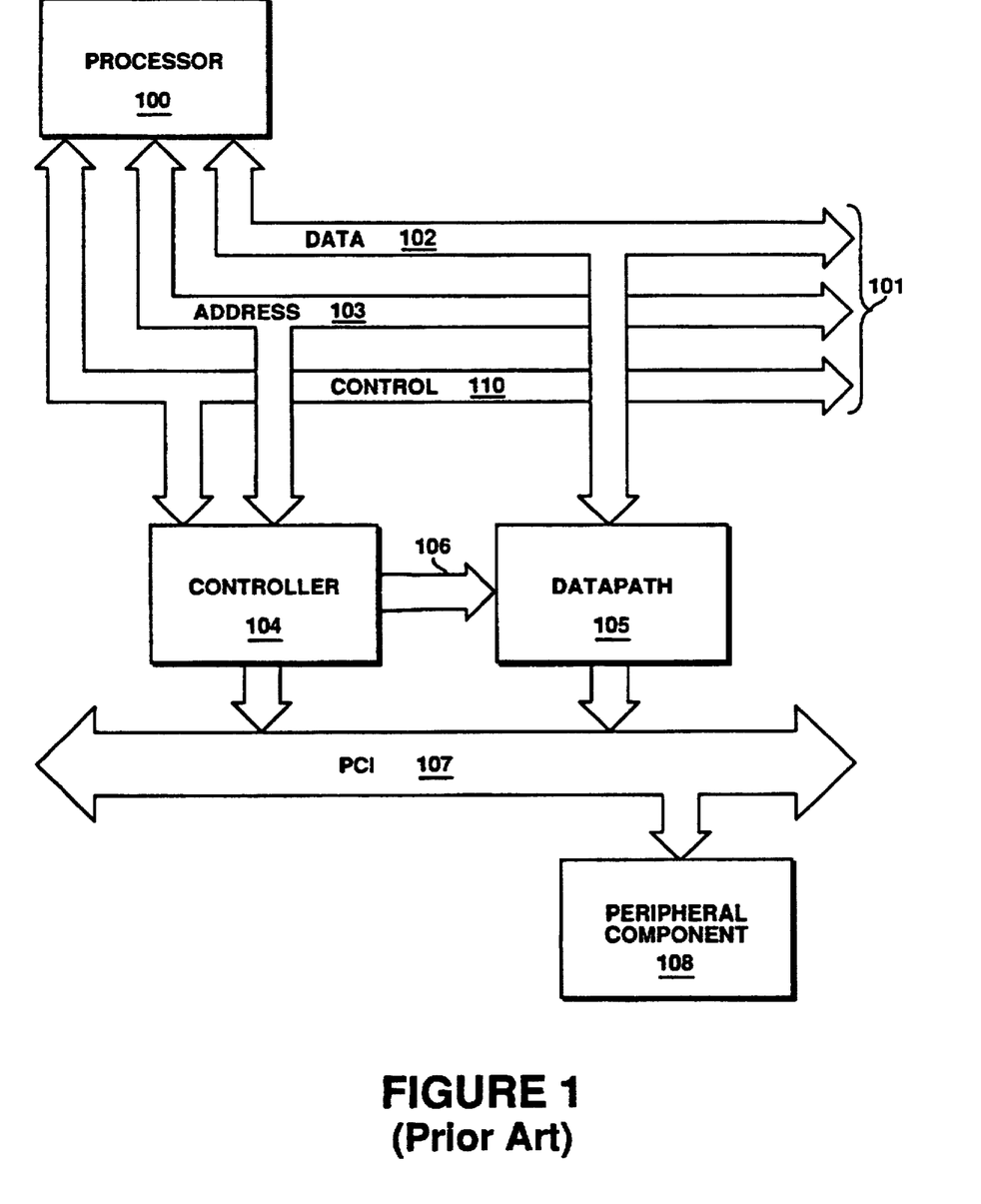
FIG. 1 illustrates a block diagram of a computer system architecture showing a host/PCI bus bridge.

FIG. 1 illustrates the computer system bus architecture described above. As illustrated, processor 100, also known as the central processing unit (CPU), is directly coupled to host bus 101. Host bus 101 is used to couple processor 100 to, for example, the computer's main memory (not shown). In addition, host bus 101 couples processor 100 to PCI bus 107 through the host/PCI bus bridge comprising controller 104 and datapath 105. Note that host bus 101 has separate signal paths for data, address, and control information.

Addresses carried on address lines 103 are transferred to PCI bus 107 through controller 104. Data carried along data lines 102 is transferred to PCI bus 107 through datapath 105. Control information carried on control lines 110 is transferred to PCI bus 107 through controller 104. Controller 104 communicates with datapath 105 through control/datapath signal lines 106 so that the controller and datapath can work together to coordinate the interface between host bus 101 and PCI bus 107. Once the data and address information is placed on PCI bus 107, it is received by a peripheral component 108 which is coupled to the PCI bus.

Due to certain electrical limitations, PCI bus 107 is only capable of supporting a finite number of loads on the bus. Each device coupled to PCI bus 107 loads down the bus. For example, datapath 105 contributes a certain amount of load on PCI bus 107, as does controller 104. In addition, peripheral component 108 also contributes a certain amount of load on the PCI bus. Therefore, only a finite number of peripheral components can be coupled to PCI bus 107. Once the PCI bus becomes fully loaded, no additional devices can be coupled to the bus.

In a typical computer system, each of processor 100, controller 104 and datapath 105 comprises an integrated circuit (IC) device or multiple devices to perform the functions of each. These devices are physically coupled to each other within a computer system by affixing the devices to a circuit board called a motherboard. The devices are attached to the motherboard through a multitude of pins or other electrical leads of the devices. The pin count of an IC device is the number of pins used to operate the device. As the pin count increases, so does the size, cost, and complexity of the device. In addition, larger devices require larger motherboards, increasing the size and cost of the computer in which the motherboard is placed.

It would be desirable to reduce the basic load on a PCI bus so that additional peripheral components or devices may be coupled to the PCI bus. In addition, for the foregoing reasons, by reducing the pin count of the IC devices in a computer system, the overall cost of the computer system may be reduced while improving its manufacturability.

SUMMARY OF THE INVENTION

A bridge is described for coupling a host bus to a peripheral component interconnect (PCI) bus. A controller is used to transfer an address from the host bus while a datapath is used to transfer data from the host bus. The address and data is then transferred to the PCI bus over a set of signal lines coupled to the PCI bus-such that each signal line transfers at least a portion of the address as well as at least a portion of data.

BRIEF DESCRIPTION OF THE DRAWINGS

FIG. 2b illustrates a more detailed schematic of the datapath of FIG. 2a.

DETAILED DESCRIPTION

A bridge for coupling a host bus to a PCI bus is described. In the following description numerous specific details such as signal names, bus protocols and operation speeds, etc., are set forth in order to provide a more thorough understanding of the present invention. However, it will be obvious to one skilled in the art that the present invention may be practiced without employing these specific details. In other instances, well-known design techniques and system configurations have not been described in detail in order to avoid unnecessarily obscuring the present invention.

Figure 2A:
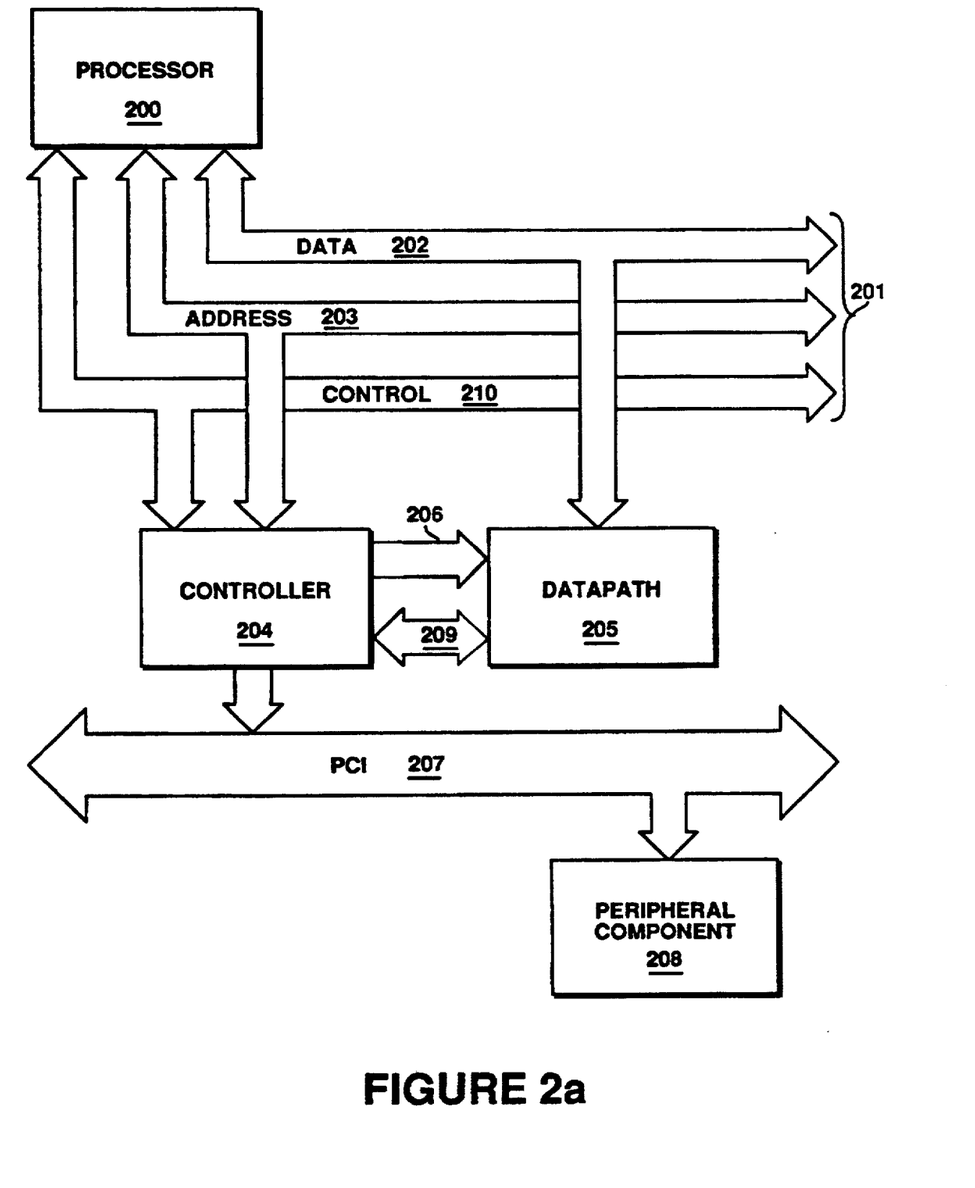
FIG. 2a illustrates a block diagram of a computer system architecture showing a host/PCI bus bridge formed in accordance with the present invention.
Figure 2B:
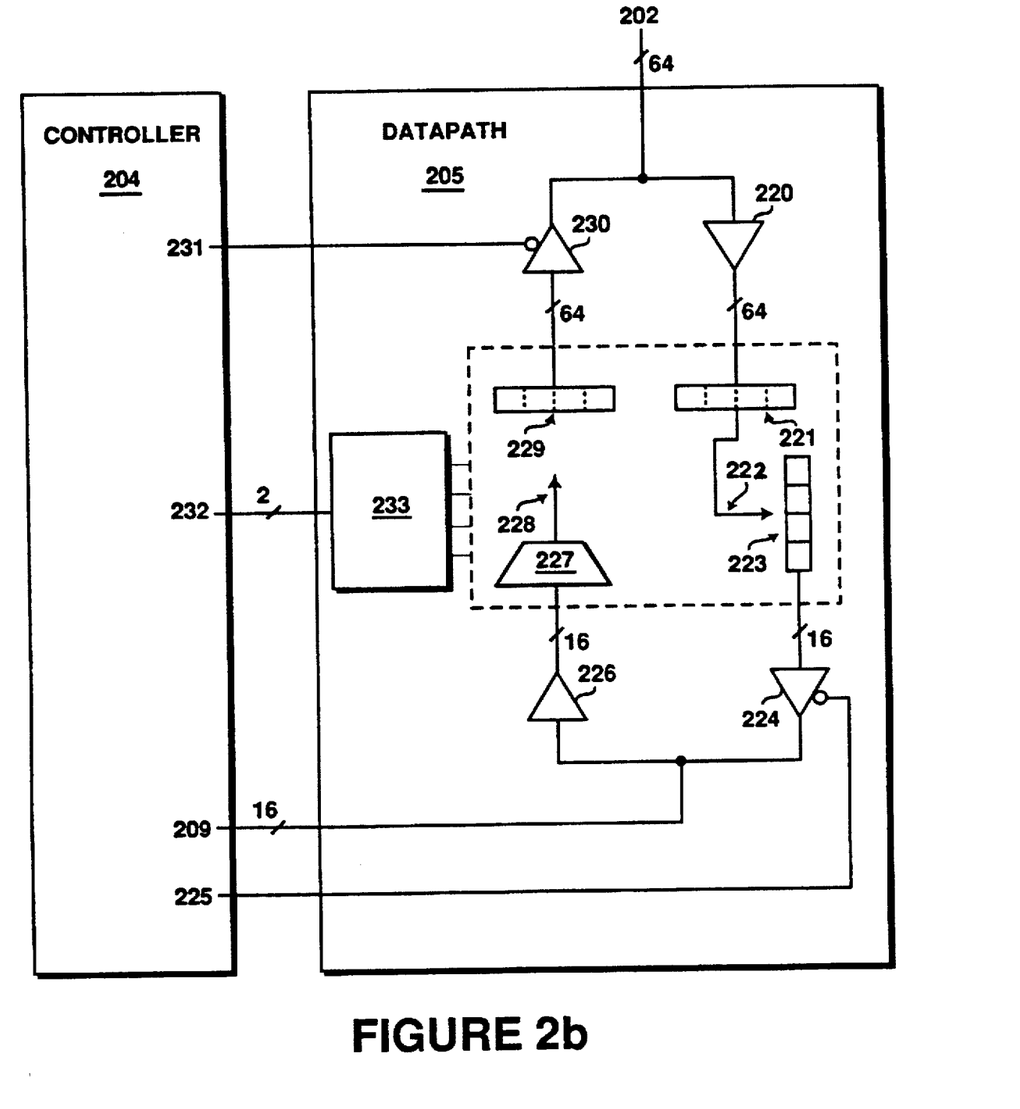
Figure 3:
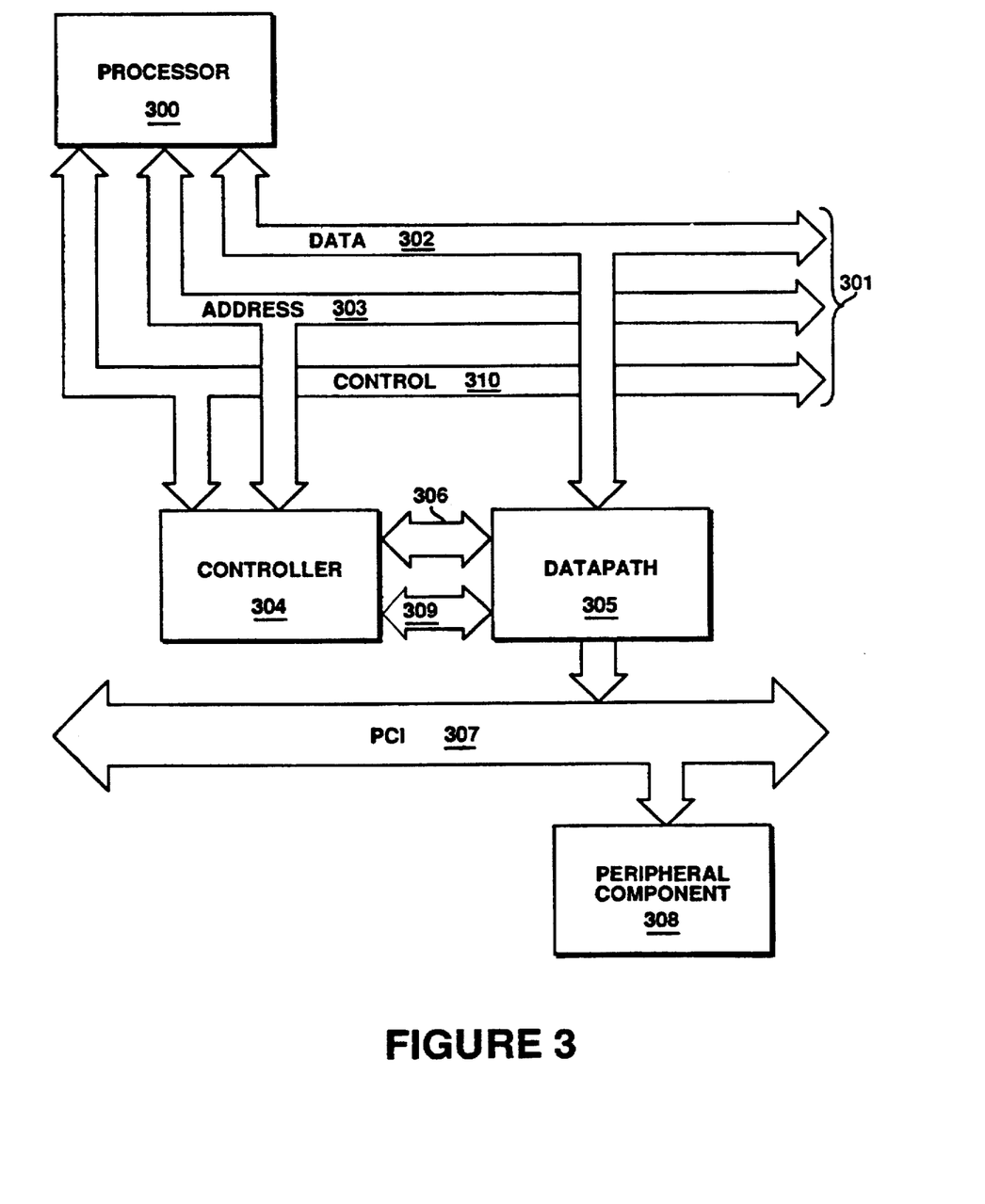
FIG. 3 illustrates a block diagram of a computer system architecture showing a host/PCI bus bridge formed in accordance with an alternate embodiment of the present invention.
Figure 4:
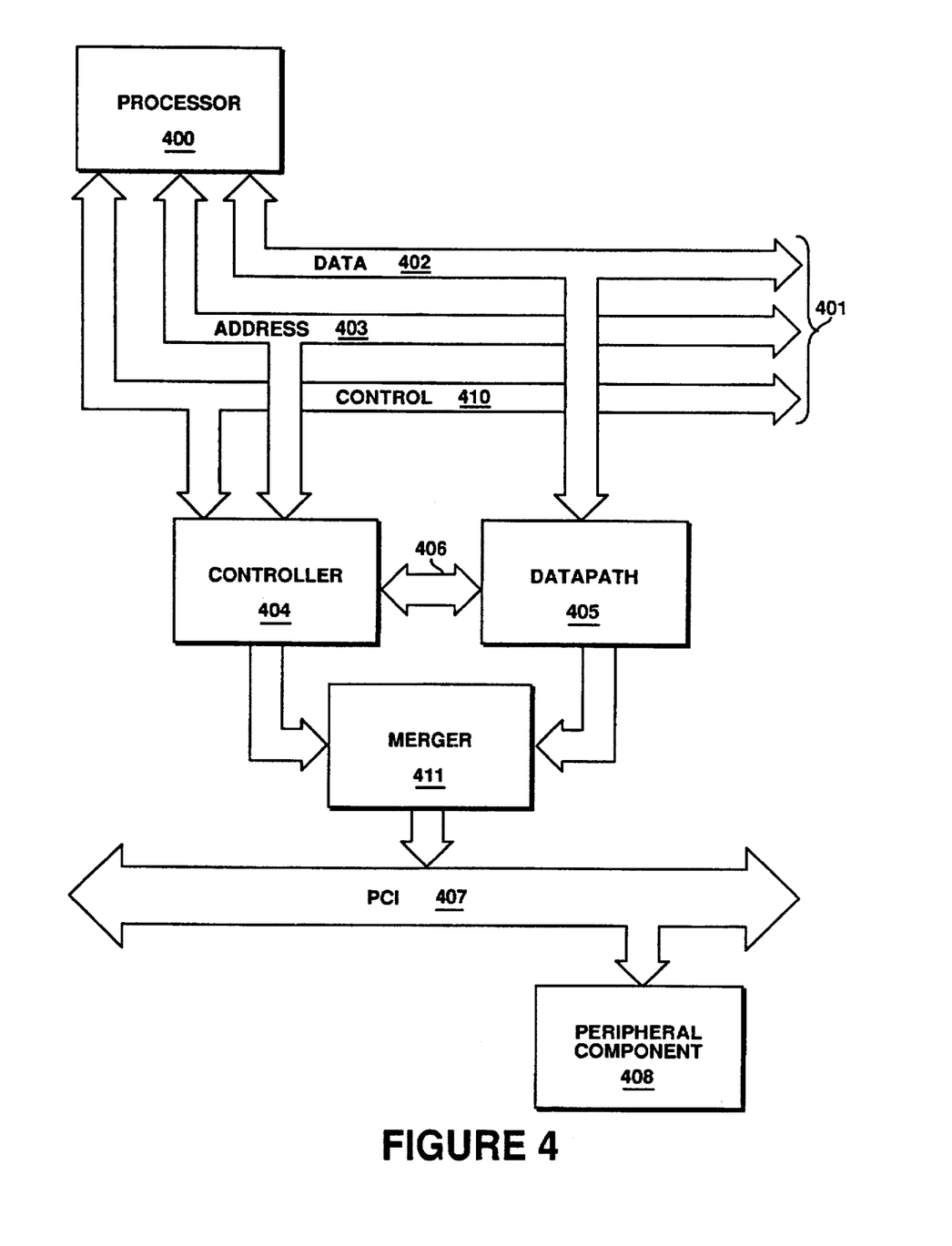
FIG. 4 illustrates a block diagram of a computer system architecture showing a host/PCI bus bridge formed in accordance with an alternate embodiment of the present invention.

While diagrams representing embodiments of the present invention have been illustrated in FIGS. 2–4, these illustrations are not intended to limit the invention. The specific architectures described herein are only meant to help clarify an understanding of the present invention and to illustrate embodiments of how the present invention may be implemented in order to achieve the desired result. It will be appreciated by one skilled in the art that the broader spirit and scope of the present invention, as set forth in the appended claims, can be applied to any type of PCI bus interface which seeks performance achievements, such as reduced load and reduced pin count, obtained by the present invention.

FIG. 2a illustrates a computer system architecture, including a host/PCI bus bridge for coupling a host bus to a PCI bus in accordance with the present invention. Processor 200 is coupled to host bus 201 through which processor 200 communicates with the rest of the computer system. In many computer system architectures, the computer system's main memory will be directly coupled to host bus 201. Host bus 201 includes data lines 202, address lines 203, and control lines 210 which carry data, address, and control information, respectively, to and from processor 200. Alternatively, any combination of data lines 202, address lines 203, and control lines 210 may be multiplexed to share common signal paths. A host bus is usually designed to meet the performance requirements associated with whatever type of processor is implemented.

Information on the separate data, address, and control signal paths of host bus 201 is transferred to PCI bus 207 through the host/PCI bus bridge comprising controller 204 and datapath 205. Controller 204 transfers address and control information from address lines 203 and control lines 210, respectively, of host bus 201 to PCI bus 207. Datapath 205 transmits data from data lines 202 of host bus 201 through link 209 to controller 204. Controller 204 communicates with datapath 205 through control/datapath signal lines 206 so that the controller and datapath can work together to coordinate the transfer of information from host bus 201 to PCI bus 207. Peripheral component 208 is coupled to PCI bus 207.

In the computer system architecture illustrated, processor 200 communicates information to peripheral component 208 by placing the information on host bus 201. Then the host/PCI bus bridge comprising controller 204 and datapath 205 transfers this information to PCI bus 207. Peripheral component 208 then accesses the information from PCI bus 207. Peripheral component 208 may include graphics accelerators, sound cards, disk drives or other peripheral devices. Note that a number of peripheral devices may be coupled to PCI bus 207 in substantially the same manner as peripheral component 208. In addition a secondary peripheral bus compliant with the ISA or EISA standards may be coupled to PCI bus 207.

In accordance with the present invention, the link 209 between datapath 205 and controller 204 operates at the same speed as host bus 201. The speed at which host bus 201 operates is twice the speed at which PCI bus 207 operates. In addition, while host bus 201 employs separate signal paths for data, address, and control information, PCI bus 207 uses a single, common multiplex signal path for this information. In other words, data, address, and control signals share common signal lines on PCI bus 207.

As a result, addresses from address lines 203 of host bus 201 cannot be transferred to PCI bus 207 at the same time data on data lines 202 of host bus 201 is transferred to the PCI bus. Therefore, controller 104 and datapath 105 of FIG. 1, while coupled to the same signal lines of PCI bus 107, cannot simultaneously transfer address and data information to PCI bus 107. While either the controller or datapath is actively transferring information to the PCI bus, the other is at rest. (Note, however, that it is possible for the controller to transfer control information to the PCI bus concurrent with the datapath's transfer of data information to the PCI bus.)

In accordance with the present invention, the redundancy associated with coupling both the controller and the datapath of a host/PCI bus bridge to the same signal lines of the PCI bus is eliminated. As illustrated in FIG. 2a, only controller 204 is coupled to PCI bus 207. Datapath 205 is coupled to controller 204 through link 209. The controller then transfers not only address and control information from address lines 203 and control lines 210 but also data from datapath 205 to PCI bus 207 over a single set of signal lines. In this manner, the load that would be associated with an additional set of signal lines necessary to couple datapath 205 directly to PCI bus 207 is eliminated. By eliminating this load, the overall load on the PCI bus is reduced, allowing additional devices or peripheral components to be coupled to the PCI bus without overloading it.

The PCI bus comprises 32 multiplexed address/data signal lines. Referring again to FIG. 1, datapath 105 must be coupled to each of these 32 signal lines to transfer data from data lines 102 of host bus 101 to PCI bus 107. Each signal line which couples datapath 105 to the PCI bus corresponds to a pin associated with the IC device or devices comprising datapath 105. Therefore, datapath 105 requires 32 pins to transfer data to PCI bus 107, and this transfer of data occurs at the PCI bus speed.

Referring now to FIG. 2a, in accordance with the present invention, host bus 201 and the link 209 between datapath 205 and controller 204 operate at twice the speed of PCI bus 207. Since link 209 operates at twice the speed of the PCI bus, the same amount of data that datapath 105 could transfer to PCI bus 107 can be transferred over link 209 in the same amount of time using only half as many pins. In particular, since each pin comprising link 209 transfers signals at twice the transfer rate of each of the 32 pins comprising the link between datapath 105 and PCI bus 107, link 209 requires only 16 pins to transfer an equal amount of data in an equal period of time.

As described above, reduction in pin count reduces cost and improves manufacturability of the system. Since datapath 205 requires only 16 pins to transfer data from data lines 202 of host bus 201 to controller 203, instead of the 32 pins required to transfer the same amount of data directly to the slower PCI bus, the pin count of datapath 205 is significantly reduced. Therefore, the host/PCI bus bridge architecture formed in accordance with the present invention not only reduces the load on the PCI bus, as described above, but also reduces system cost and improves manufacturability by reducing pin count.

Alternatively, the link 209 between datapath 205 and controller 204 may operate any number of times faster than the speed at which PCI bus 207 operates. In such embodiments, the pin count of datapath 205 may be appropriately reduced. For example, in one embodiment the link between the datapath and the controller operates at four times the speed of the PCI bus. In this embodiment, only eight pins would be required to transfer the same amount of data in the same amount of time between the datapath and the controller. In general, where the speed at which the datapath is able to transfer data to the controller is n times faster than the speed at which the PCI bus operates, 1/n as many pins would be required to transfer the same amount of data in the same amount of time.

FIG. 2b illustrates the internal operation of datapath 205 of FIG. 2a. In the embodiment illustrated, datapath 205 is coupled to 64 data lines 202. These 64 data lines are coupled to a host bus input register 221 through an input buffer 220. A state machine 233, coupled to controller 204 through lines 232, controls the loading of output register 223 from host bus input register 221 through lines 222. Output register 223 is coupled to the 16 lines of link 209 through an output buffer 224, the operation of which is controlled by controller 204 through line 225. Link 209 is also coupled to multiplexer 227 through input buffer 226. State machine 233 also controls the loading of input register 229 from the output of multiplexer 227 through lines 228. Finally, input register 229 is coupled to the 64 data lines 202 through output buffer 230, the operation of which is controlled by controller 204 through line 231. Note that lines 231, 232, and 225 of FIG. 2b are collectively represented as control/datapath signal lines 206 of FIG. 2a.

To transfer a 64 bit data string from data lines 202 to controller 204, the 64 bit data string first passes through input buffer 220 and is loaded into host bus input register 221 of datapath 205. This 64 bit string, or quad word (Qword), is then broken up into four 16 bit words for storage in the four output registers of output register 223. The actual division of the Qword in input register 221 and storage of the individual words into output register 223 is controlled by state machine 233 responsive to signals from controller 204 over command lines 232. Since two command lines control state machine 233, the state machine is capable of issuing up to four different commands controlling the loading and storage of the words in output register 223.

A LOAD command to state machine 233 causes each of the four registers of output register 223 to be simultaneously loaded through lines 222 with a word of the Qword. A LOAD-SWITCH command to the state machine causes the upper two words of the Qword, or double word (Dword), to be loaded into the lower two registers of output register 223. This function may be found useful in situations where valid data is only found in the upper 32 lines of data lines 202. A SHIFT command to state machine 233 causes each word in the four output registers of output register 223 to shift to the next lower register. Finally, a NO-LOAD command will maintain the contents of output register 223.

Once output register 223 is loaded, an output enable signal is transmitted to output buffer 224 over signal line 225 from the controller, opening the output buffer. Upon opening output buffer 224, the 16 bit word in the lowest register of output register 223 becomes available to controller 204 over the 16 lines of link 209. Next, the controller issues a SHIFT command to state machine 233, causing the next word to be loaded into the lowest register of output register 223. Consequently, this next word is then made available to controller 204 through link 209. The controller continues to issue SHIFT commands, reading words from the lowest register of output register 223 until all four words of the original Qword of data are read into the controller.

To transfer a Qword of data from controller 204 back to data lines 202, circuitry similar to that described above is included in the controller to break up the Qword into four individual words for transfer over the 16 lines of link 209 to datapath 205. Each consecutive word fed through link 209 passes through input buffer 226 to multiplexer 227. State machine 233 then directs the loading of these words into input register 229 in response to signals from controller 204 over command lines 232. Since two command lines control state machine 233, the state machine is capable of issuing up to four different commands controlling the loading of the words into input register 229 from multiplexer 227.

A LOAD-LO command to state machine 233 causes the lower Dword of input register 229 to be loaded with two words through lines 228. A LOAD-HI command to state machine 233 causes the upper Dword of input register 229 to be loaded with two words through lines 228. In the case of both the LOAD-LO and LOAD-HI commands, only one word of the Dword is loaded per host clock. Simultaneous loading cannot be employed here since only a single word is available to multiplexer 227 over the 16 lines of link 209 at any given time. Finally, a NO-LOAD command will maintain the contents of input register 229.

Once input register 229 is loaded, an output enable signal is transmitted to output buffer 230 over signal line 231 from the controller, opening the output buffer. Upon opening output buffer 230, the reconstructed Qword in input register 229 becomes available to data lines 202 of the host bus. Note that Controller 204 incorporates circuitry similar to that described above to transfer data received through link 209 from datapath 205 to the PCI bus.

In embodiments in which the datapath or controller comprises multiple integrated circuit (IC) devices, the circuitry described herein is appropriately modified to coordinate the transfer of information amongst the multiple devices. Alternatively, other circuit achitectures may be employed to break-up and reconstruct data strings of varying lengths for transferring the data through the narrower link between the datapath and controller. However, in an embodiment in which the link is wide enough to allow the entire data string to be simultaneously transferred to the controller, much of this circuitry may be omitted.

In an alternate embodiment of the present invention, the datapath may couple the data lines of the host bus to the PCI bus while the controller couples the address lines of the host bus to the datapath. In this embodiment, it is the datapath which-transfers not only data from the host bus to the PCI bus but also address information from the controller to the PCI bus. This embodiment is illustrated in FIG. 3.

FIG. 3 illustrates a computer system architecture, including a host/PCI bus bridge for coupling a host bus to a PCI bus in accordance with the present invention. Processor 300 is coupled to host bus 301 through which processor 300 communicates with the rest of the computer system. Host bus 301 includes data lines 302, address lines 303, and control lines 310 which carry data, address, and control information, respectively, to and from processor 300. Alternatively, any combination of data lines 302, address lines 303, and control lines 310 may be multiplexed to share common signal paths.

Information on the separate data, address, and control signal paths of host bus 301 is transferred to PCI bus 307 through the host/PCI bus bridge comprising controller 304 and datapath 305. Controller 304 transfers address and control information from address lines 303 and control lines 310, respectively, of host bus 301 to datapath 305 through link 309. Datapath 305 transfers data from data lines 302 of host bus 301, as well as address and control information from controller 304 to PCI bus 307. Controller 304 communicates with datapath 305 through control/datapath signal lines 306 so that the controller and datapath can work together to coordinate the transfer of information from host bus 301 to PCI bus 307. Peripheral component 308 is coupled to PCI bus 307.

In the computer system architecture illustrated, processor 300 communicates information to peripheral component 308 by placing the information on host bus 301. Then the host/PCI bus bridge comprising controller 304 and datapath 305 transfers this information to PCI bus 307. Peripheral component 308 then accesses the information from PCI bus 307. Link 309 operates faster than PCI bus 307. Therefore, as described above in conjunction with link 209 of FIG. 2, fewer pins are required for controller 304 to transfer information to datapath 305 over high-speed link 309 than would be required to transfer the same amount of information directly to the slower PCI bus 307. As a result, the pin count of controller 304 is reduced as well as the load on PCI bus 307.

In another embodiment of the present invention, the controller transfers address information from the host bus to an intermediate device coupled to the PCI bus. The datapath also transfers data from the host bus to this intermediate device. The intermediate device then transfers both address and data information to the PCI bus over a single set of signal lines, thereby reducing the load on the bus. This embodiment is illustrated in FIG. 4.

FIG. 4 illustrates a computer system architecture, including a host/PCI bus bridge for coupling a host bus to a PCI bus in accordance with an alternate embodiment present invention. Processor 400 is coupled to host bus 401 through which processor 400 communicates with the rest of the computer system. Host bus 401 includes data lines 402, address lines 403, and control lines 410 which carry data, address, and control information, respectively, to and from processor 400. Alternatively, any combination of data lines 402, address lines 403, and control lines 410 may be multiplexed to share common signal paths.

Information on the separate data, address, and control signal paths of host bus 401 is transferred to PCI bus 407 through the host/PCI bus bridge comprising controller 404, datapath 405, and merger 411. Controller 404 transfers address and control information from address lines 403 and control lines 410, respectively, of host bus 401 to merger 411. Datapath 405 transfers data from data lines 402 of host bus 401 to merger 411. Controller 404 communicates with datapath 405 through control/datapath signal lines 406 so that the controller and datapath can work together to coordinate the transfer of information from host bus 401 to merger 411. Merger 411 then transfers address and control information from controller 404 as well as data from datapath 405 to PCI bus 407 over a single set of signal lines. Peripheral component 408 is coupled to PCI bus 407.

In the computer system architecture illustrated, processor 400 communicates information to peripheral component 408 by placing the information on host bus 401. Then the host/PCI bus bridge comprising controller 404, datapath 405, and merger 411 transfers this information to PCI bus 407. Peripheral component 408 then accesses the information from PCI bus 407. While this embodiment may not support pin count reduction efforts since merger 411 may add additional cost and size to the computer system, FIG. 4 illustrates a method for reducing the load on a PCI bus without redesigning the controller and datapath.

Note that embodiments of the present invention have been described in which a processor coupled to a host bus communicates information over a host/PCI bus bridge to a peripheral component coupled to a PCI bus. It is to be appreciated by one skilled in the art that the present invention may similarly be employed where the peripheral component communicates information back over the host/PCI bus bridge to the processor.

Thus a design for a host/PCI bus bridge has been described which reduces the load on the PCI bus associated with the bridge. In addition, a host/PCI bus bridge designed in accordance with the present invention reduces the pin count.

What is claimed is:

1. A bridge for coupling a first bus operating at a first bus speed to a second bus operating at a second bus speed, said bridge comprising:
   a controller coupled to said first bus to transfer an address from said first bus;
   a datapath coupled to said first bus to transfer data from said first bus; and
   a plurality of signal lines coupled to said second bus, said second bus being capable of supporting only a finite number of loads, each signal line of said plurality of signal lines to transfer at least a portion of both said address and said data to said second bus, said plurality of signal lines contributing a first amount of load on said second bus that is less than a second amount of load that would be contributed on said second bus if each signal line of said plurality of signal lines were dedicated to transferring only said portion of said address.

2. The bridge of claim 1 wherein said datapath is coupled to said controller through a link, said datapath to transfer said data to said controller over said link at a datapath speed, said controller to transfer said address and said data over said plurality of signal lines to said second bus.

3. The bridge of claim 1 wherein said controller is coupled to said datapath through a link, said controller to transfer said address to said datapath over said link at a controller speed, said datapath to transfer said address and said data over said plurality of signal lines to said second bus.

4. The bridge of claim 1 further comprising a merger, said merger being coupled to said controller, said controller to transfer said address to said merger, said merger also being coupled to said datapath, said datapath to transfer said data to said merger, said merger to transfer said address and said data over said plurality of signal lines to said second bus.

5. The bridge of claim 2 wherein said datapath speed is faster than said second bus speed and the number of pins to transfer said data from said datapath to said controller within a finite period of time is less than the number of pins which would be required to transfer said data from said datapath to said second bus within an equivalent, finite period of time.

6. The bridge of claim 3 wherein said controller speed is faster than said second bus speed, and the number of pins to transfer said address to said datapath within a finite period of time is less than the number of pins which would be required to transfer said address from said controller to said second bus within an equivalent, finite period of time.

7. The bridge of claim 5 wherein approximately 16 pins are required to transfer said data to said controller from said datapath.

8. The bridge of claim 2 wherein said first bus speed is equivalent to said datapath speed.

9. The bridge of claim 7 wherein said first bus speed is equivalent to said datapath speed.

10. The bridge of claim 1, wherein the first bus operating at a first bus speed includes a host bus operating at a host bus speed and wherein the second bus operating at a second bus speed includes a Peripheral Component Interconnect (PCI) bus operating at a PCI bus speed.

11. A bridge for coupling a first bus operating at a first bus speed to a second bus operating at a second bus speed, said bridge comprising:
   a datapath coupled to said first bus at one end and a controller at another end, said datapath to transfer data from said first bus to said controller at a datapath speed, said datapath speed being approximately n times faster than said second bus speed, and the number of pins to transfer said data to said controller within a finite period of time is approximately 1/n times the number of pins which would be required to transfer said data to said second bus within an equivalent, finite period of time; and said controller coupled to said first bus, said datapath, and said second bus, said controller to transfer an address from said first bus to said second bus, said controller also to transfer said data from said datapath to said second bus such that an additional load to said second bus is not required as a result of routing said data from said datapath through said controller rather than directly to said second bus.

12. The bridge of claim 11 wherein said datapath speed is approximately twice said second bus speed, and approximately 16 pins transfer said data from said datapath to said controller within a finite period of time while approximately 32 pins would be required to transfer said data from said datapath to said second bus within an equivalent, finite period of time.

13. The bridge of claim 11 wherein said first bus speed is equivalent to said datapath speed.

14. The bridge of claim 11, wherein the first bus operating at a first bus speed includes a host bus operating at a host bus speed and wherein the second bus operating at a second bus speed includes a Peripheral Component Interconnect (PCI) bus operating at a PCI bus speed.

15. A computer system comprising:

a processor coupled to a first bus, said first bus to operate at a first bus speed;

a peripheral device coupled to a second bus, said second bus to operate at a second bus speed; and a bridge to couple said first bus to said second bus, enabling communication between said processor and said peripheral device, said bridge comprising a datapath to transfer data from said first bus to a controller at a datapath speed, said controller to transfer an address from said first bus to said second bus, said controller also to transfer said data from said datapath to said second bus.

16. The computer system of claim 15 wherein said datapath speed is approximately twice said second bus speed, and the number of pins that transfer said data from said datapath to said controller within a given period of time is approximately half the number of pins which would be required to transfer said data from said datapath to said second bus within said period of time.

17. The computer system of claim 15 wherein said datapath speed is approximately n times faster than said second bus speed, and the number of pins that transfer said data from said datapath to said controller within a given period of time is approximately 1/n times the number of pins which would be required to transfer said data from said datapath to said second bus within said period of time.

18. The computer system of claim 16 wherein approximately 16 pins transfer said data to said controller from said datapath.

19. The computer system of claim 15 wherein said first bus speed is equivalent to said datapath speed.

20. The computer system of claim 16 wherein said first bus speed is equivalent to said datapath speed.

21. The computer system of claim 15 wherein an additional load to said second bus is not required as a result of routing said data from said datapath through said controller rather than directly to said second bus.

22. The computer system of claim 15, wherein the first bus operating at a first bus speed includes a host bus operating at a host bus speed and wherein the second bus operating at a second bus speed includes a Peripheral Component Interconnect (PCI) bus operating at a PCI bus speed.

23. A computer system comprising:

a processor coupled to a first bus, said first bus operating at a first bus speed;

a peripheral device coupled to a second bus, said second bus operating at a second bus speed; and a bridge for coupling said first bus to said second bus for communicating information from said processor to said peripheral device, said bridge comprising a datapath, said datapath transferring data from said first bus to said controller at a datapath speed, said datapath speed being approximately n times faster than said second bus speed, and the number of pins that transfer said data to said controller within a given period of time is approximately 1/n times the number of pins which would be required to transfer said data to said second bus within said period of time, said controller transferring an address from said first bus to said second bus, said controller further transferring said data from said datapath to said second bus such that an additional load to said second bus is not required as a result of routing said data from said datapath through said controller rather than directly to said second bus.

24. The computer system of claim 23 wherein said datapath speed is approximately twice said second bus speed, and approximately 16 pins transfer said data from said datapath to said controller within said period of time while approximately 32 pins would be required to transfer said data from said datapath to said second bus within said period of time.

25. The computer system of claim 24 wherein said first bus speed is equivalent to said datapath speed.

26. The computer system of claim 23, wherein the first bus operating at a first bus speed includes a host bus operating at a host bus speed and wherein the second bus operating at a second bus speed includes a Peripheral Component Interconnect (PCI) bus operating at a PCI bus speed.

27. An interface means for coupling a first bus means operating at a first bus speed to a second bus operating at a second bus speed comprising:

a controller means for transferring an address from said first bus means;

a datapath means for transferring data from said first bus means; and a means for transferring said address and said data to said second bus over a plurality of signal lines, each of said plurality of signal lines transferring at least a portion of said address and at least a portion of said data to said second bus, said plurality of signal lines contributing a first amount of load on said second bus that is less than a second amount of load that would be contributed on said second bus if each signal line of said plurality of signal lines were dedicated to transferring only said portion of said address.

28. The interface means of claim 27 further comprising a means for transferring said data from said datapath means to said controller means at a datapath speed, said controller means transferring said address and said data over said plurality of signal lines to said second bus.

29. The interface means of claim 27 further comprising a means for transferring said address from said controller means to said datapath means at a controller speed, said datapath means transferring said address and said data over said plurality of signal lines to said second bus.

30. The interface means of claim 27 further comprising a merger means, said merger means being coupled to said controller means, said controller means transferring said address to said merger means, said merger means also being coupled to said datapath means, said datapath means transferring said data to said merger means, said merger means transferring said address and said data over said plurality of signal lines to said second bus.

31. The interface means of claim 28 wherein said datapath speed is faster than said second bus speed and the number of pins that transfer said data from said datapath means to said controller means within a finite period of time is less than the number of pins which would be required to transfer said data from said datapath means directly to said second bus within an an equivalent, finite period of time.

32. The interface means of claim 29 wherein said controller speed is faster than said second bus speed, and the number of pins to transfer said address to said datapath within a finite period of time is less than the number of pins which would be required to transfer said address from said controller means to said second bus within an equivalent, finite period of time.

33. The interface means of claim 31 wherein approximately 16 pins transfer said data to said controller means from said datapath means.

34. The interface means of claim 28 wherein said first bus speed is equivalent to said datapath speed.

35. The interface means of claim 32 wherein said first bus speed is equivalent to said datapath speed.

36. The interface means of claim 27, wherein the first bus means operating at a first bus speed includes a host bus means operating at a host bus speed and wherein the second bus operating at a second bus speed includes a Peripheral Component Interconnect (PCI) bus operating at a PCI bus speed.

37. A computer system comprising:
a processing means coupled to a first bus means, said first bus means to operate at a first bus speed;
a peripheral device means coupled to a second bus, said second bus to operate at a second bus speed; and
a bridge means for coupling said first bus means to said second bus for communicating information from said processing means to said peripheral device means, said bridge means comprising a datapath means, said datapath means to transfer data from said first bus means to a controller means at a datapath speed, said controller means to transfer an address from said first bus means to said second bus, said controller means also to transfer said data from said datapath means to said second bus.

38. The computer system of claim 37 wherein said datapath speed is approximately twice said second bus speed, and the number of signal lines that transfer said data from said datapath means to said controller means within a given period of time is approximately half the number of pins which would be required to transfer said data from said datapath means directly to said second bus within said period of time.

39. The computer system of claim 37 wherein said datapath speed is approximately n times faster than said second bus speed, and the number of signal lines that transfer said data from said datapath means to said controller means within a given period of time is approximately 1/n times the number of pins which would be required to transfer said data from said datapath means directly to said second bus within said period of time.

40. The computer system of claim 38 wherein approximately 16 pins transfer said data to said controller means from said datapath means.

41. The computer system of claim 37 wherein said first bus speed is equivalent to said datapath speed.

42. The computer system of claim 38 wherein said first bus speed is equivalent to said datapath speed.

43. The computer system of claim 37 wherein an additional load to said second bus is not required as a result of routing said data from said datapath means through said controller means rather than directly to said second bus.

44. The computer system of claim 37, wherein the first bus means operating at a first bus speed includes a host bus operating at a host bus speed and wherein the second bus operating at a second bus speed includes a Peripheral Component Interconnect (PCI) bus operating at a PCI bus speed.

45. A method for transferring an address and data from a first bus that uses separate signal lines for said address and said data to a second bus that uses common, multiplexed signal lines for said address and said data, said method comprising the steps of:
transferring at least a portion of said address from said first bus to said second bus through a plurality of pins coupled to said second bus; and
transferring at least a portion of said data from said first bus to said second bus through said plurality of pins wherein each pin of said plurality of pins transfers at least a portion of both said address and said data to said second bus.

46. The method of claim 45 wherein said step of transferring at least a portion of said address from said first bus to said second bus is done through a controller coupled to said plurality of pins, and said step of transferring at least a portion of said data from said first bus to said second bus includes the step of transferring through a datapath said portion of said data from said first bus to said controller.

47. The method of claim 45 wherein said step of transferring at least a portion of said data from said first bus to said second bus is done through a datapath coupled to said plurality of pins, and said step of transferring at least a portion of said address from said first bus to said second bus includes the step of transferring through a controller said portion of said address from said first bus to said datapath.

48. The method of claim 45 wherein said step of transferring at least a portion of said address from said first bus to said second bus includes the step of transferring through a controller said portion of said address from said first bus to a merger, said step of transferring at least a portion of said data from said first bus to said second bus includes the step of transferring through a datapath said portion of said data from said first bus to said merger, said merger is coupled to said plurality of pins, said first bus is a host bus, and said second bus is a Peripheral Component Interconnect (PCI) bus.

49. The method of claim 45 wherein said first bus is a host bus and said second bus is a Peripheral Component Interconnect (PCI) bus.

50. The method of claim 46 wherein said first bus is a host bus and said second bus is a Peripheral Component Interconnect (PCI) bus.

51. The method of claim 47 wherein said first bus is a host bus and said second bus is a Peripheral Component Interconnect (PCI) bus.

52. The method of claim 50 wherein said PCI bus operates at a PCI bus speed, said step of transferring through said datapath said portion of said data from said first bus to said controller is done at a datapath speed, said datapath speed being faster than said PCI bus speed, and the number of pins to transfer said data to said controller within a finite period of time is less than the number of pins which would be required to transfer said data from said datapath to said second bus within an equivalent, finite period of time.

53. The method of claim 51 wherein said PCI bus operates at a PCI bus speed, said step of transferring through said controller said portion of said address from said first bus to said datapath is done at a controller speed, said controller speed being faster than said PCI bus speed, and the number of pins to transfer said address to said datapath within a finite period of time is less than the number of pins which would be required to transfer said address from said controller to said second bus within an equivalent, finite period of time.

* * * * *

UNITED STATES PATENT AND TRADEMARK OFFICE
CERTIFICATE OF CORRECTION

PATENT NO.    : 5,740,385
DATED         : April 14, 1998
INVENTOR(S)   : Hayek et al.

It is certified that error appears in the above-identified patent and that said Letters Patent is hereby corrected as shown below:

In the Title Page at [75] following "Gary A. Solomon"
insert --Peter D. MacWilliams--

Signed and Sealed this

Fifth Day of January, 1999

Attest:

Attesting Officer

*Acting Commissioner of Patents and Trademarks*